United States Patent
Shebanow et al.

(10) Patent No.: US 7,293,162 B2
(45) Date of Patent: Nov. 6, 2007

(54) SPLIT DATA-FLOW SCHEDULING MECHANISM

(75) Inventors: Michael C Shebanow, Saratoga, CA (US); Michael G Butler, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 10/323,337

(22) Filed: Dec. 18, 2002

(65) Prior Publication Data

US 2004/0123077 A1 Jun. 24, 2004

(51) Int. Cl.
*G06F 9/40* (2006.01)

(52) U.S. Cl. ..................................... 712/217
(58) Field of Classification Search ................. 712/217
See application file for complete search history.

(56) References Cited

U.S. PATENT DOCUMENTS

| | | | | |
|---|---|---|---|---|
| 5,951,670 | A * | 9/1999 | Glew et al. | 712/23 |
| 6,070,235 | A * | 5/2000 | Cheong et al. | 712/23 |
| 6,122,721 | A * | 9/2000 | Goddard et al. | 712/23 |
| 6,292,884 | B1 * | 9/2001 | Tran et al. | 712/216 |
| 6,311,267 | B1 * | 10/2001 | Nguyen et al. | 712/217 |
| 6,351,804 | B1 * | 2/2002 | Pflum | 712/217 |
| 6,542,986 | B1 * | 4/2003 | White | 712/217 |
| 6,643,767 | B1 * | 11/2003 | Sato | 712/219 |
| 6,742,111 | B2 * | 5/2004 | Soni | 712/217 |

OTHER PUBLICATIONS

Mahlke, Scott A. et al, "A Comparison of Full and Partial Predicated Execution Support for ILP Processors," ISCA-22, Jun. 1995, 12 pages.

"PC Processor Microarchitecture," ExtremeTech, retrieved Dec. 19, 2001, <http://www.extremetech.com/article0,3396,apn%3D17%26s%3D1598%26a%3>, 4 pages.

"Understanding the Intel P6 Microarchitecture," Chipcenter, retrieved Dec. 19, 2001 <http://www.chipcenter.com/eexpert/code-opt/dgilbertC001:html?PRINIT=true>.

Moudgill, Mayan, "Precise Interrupts," IEEE Micro, Feb. 1996, pp. 58-67.

Gilbert, David, "Microprocessor Functional Unit Series, Part 4: Branch Unit," retrieved Dec. 19, 2001, <http://www.chipcenter.com/eexpert/dgilbert/dgilbert033.html?PRINT=true>.

Wang, Dazhi and Zhang, Jing, "Develop dynamically scheduled processor model using ATOM," Duke University, Dec. 10, 2000, 12 pages.

"Petnium® Pro Processor Technical Glossary," 2 pages.

Intel Corporation, "A Tour of the Pentium® Pro Processor Microarchitecture," Oct. 1995.

* cited by examiner

*Primary Examiner*—Eddie Chan
*Assistant Examiner*—Jacob Petranek
(74) *Attorney, Agent, or Firm*—Fenwick & West LLP

(57) ABSTRACT

A scheduling scheme and mechanism for a processor system is disclosed. The scheduling scheme provides a reservation station system that includes a control reservation station and a data reservation station. The reservation station system receives an operational entry and for each operational entry it identifies scheduling state information, operand state information, and operand information. The reservation station system stores the scheduling state information and operand information as a control reservation station entry in the control reservation station and stores the operating state information and the operand information as a data reservation station entry in the data reservation station. When control reservation station entries are identified as ready, they are scheduled and issued for execution by a functional unit. The result from the functional unit is distributed within the control reservation station and the data reservation station for subsequent operational entries to use in preparation for scheduling and issuing those entries for execution.

38 Claims, 4 Drawing Sheets

SPLIT DATA-FLOW SCHEDULING MECHANISM

BACKGROUND OF THE INVENTION

1. Field of the Invention

The present invention relates to scheduling instructions for computer processing, and more particularly, to a scheduling scheme and mechanism to process instructions through a functional unit in a processor.

2. Description of the Related Arts

A conventional reservation station is a mechanism in which operational entries of a data flow wait for their dependent component parts before being scheduled and issued for execution in a functional unit of a processor. The dependent component parts are operands that must be provided in order for the operational entries to continue on with processing. A functional unit may be, for example, an arithmetic logic unit or a multiplier unit. A benefit of this design is that data is only distributed once.

Conventional reservation stations use one of two approaches to schedule a data flow operation through a reservation station. The first approach is a distributed reservation station approach. In this approach, a multitude of reservation stations are distributed throughout the processor. Each reservation station is typically connected with one or two functional units. As each operation in the distributed reservation station receives its full compliments of operands, it is scheduled for execution by a respective functional unit.

However, a significant timing problem is introduced with this first approach when scheduling back-to-back dependent operations, each of which are carried out within a single clock cycle. Specifically, the following operations must be completed within a single clock cycle: (1) selection of an operation to be scheduled, (2) read a result tag that is associated with the operation to be scheduled, (3) distribute the result tag to other reservation stations, (4) match the distributed result tag across all operands having a non-ready status in a local reservation station, and (5) update the status of all operands from a non-ready state to a ready state.

With the conventional distributed reservation station approach, as clock rates increase, it becomes increasingly difficult to make the timing of the above five steps. One reason for this is that the third step, distribution of the result tag to other reservation stations, takes a significant amount of time, particularly in systems in which the reservations stations are not proximally located within the processor. Hence, the distributed reservation station approach can cause significant processing delays as additional clock cycles are needed to schedule and issue back-to-back single clock cycle operational entries.

The second approach for scheduling a data flow through a reservation station uses a centralized reservation station. In this approach, the distributed reservation stations are eliminated in favor of a single, central reservation station. An advantage of the central reservation station is that the time-consuming step for distributing the result tag to other reservation stations is effectively eliminated.

However, a problem with this second approach is that the operand data must be distributed both to and from the reservation station as the operations are scheduled. The flow of operand data to and from the central reservation station increases the number of data buses in the processor more than three-fold because each dyadic functional unit requires two source buses and one result bus rather than the single result bus used in the distributed reservation station approach. The additional bus architecture and structure increases chip complexity, implementation, costs, and the amount of space needed on an integrated circuit chip.

Therefore, there is a need for a reservation station system that provides timely scheduling and issuance of instructions without requiring additional bus architecture and structure within a processing system.

BRIEF SUMMARY OF THE INVENTION

One embodiment of the present invention includes a reservation station system having a control reservation station and one or more data reservation stations. Information about an operational entry (e.g., an instruction to multiply two numbers) is split between the control reservation station and the one or more data reservation stations. The control reservation station is configured to function as a central location for reading and storing information from the operational entry relating to a scheduling state and an operand state. The one or more data reservation stations are configured to function as locations for reading and storing information from the operational entry relating to the operand state and the operand data itself.

In this embodiment, the control reservation station is configured to read and store scheduling state information and operand state information for the operational entry. The scheduling state information includes, for example, a status of the operational entry and a scheduling tag for the operational entry. The operational state information may include one or more operand records having operand state information and corresponding operand tags for the operational entry.

In addition to reading and storing the scheduling state information and operand state information identified above, the control reservation station can be configured to examine and identify each entry in the control reservation station that is marked as having a valid state and that have their operands in a ready state. The control reservation station may also be configured to schedule for issuance each entry meeting these criteria. Further, the control reservation station may be configured to distribute tags associated with the scheduled entries to the data reservation station and also within the control reservation station to update dependent operand state information.

Each data reservation station can be configured to read and store the operand state information and the operand data itself. Specifically, the data reservation station reads and stores one or more operand records that include operand state information and corresponding operand tags for the operational entry. The operand data is also referred to as the operand. Each data reservation station may also be configured to read and store opcode information. Opcode information specifies the operation to be performed by a particular functional unit when the instruction is scheduled from the reservation station system.

In addition, each data reservation station may be configured to receive the schedule tag for each scheduled control reservation station entry and read instructions corresponding to the schedule tag for each scheduled control reservation station entry. Further, each data reservation station can be configured to capture results from the execution of the scheduled instruction so that these results can be applied to other entries in the reservation station system. These results provide the operand data that may be used to complete other operational entries that would be prepared for scheduling.

By configuring a reservation station in the manner disclosed, the present invention provides the benefits of a centralized reservation station that quickly distributes operand data for operational entries pending scheduling as well as the benefits of a distributed reservation station which use fewer data buses. For example, the reservation station system configuration beneficially provides a control reservation station that is focused on scheduling information. The control reservation station advantageously eliminates tag distribution delay for scheduling purposes. In addition, the scheduling logic now has more time to perform its function because the tag distribution delay represents a significant portion of the total scheduling "loop" time, i.e., the time to wait for operand results to loop around so that an instruction is finally ready for scheduling.

In another example, one or more data reservation stations advantageously avoid the need to transmit result data to the control reservation station only to have the control reservation station transmit it right back through the system later when the instruction is scheduled for issuance. Hence, the one or more data reservation stations beneficially eliminate the need for numerous operand buses between their and the control reservation station within the processor.

The features and advantages described in this specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the inventive subject matter.

BRIEF DESCRIPTION OF THE SEVERAL VIEWS OF THE DRAWINGS

The above and other more detailed and specific objects and features of the present invention are more fully disclosed in the following detailed description, reference being had to the accompanying drawings, in which.

DETAILED DESCRIPTION OF THE INVENTION

Generally, an operation entry comprises a data flow operation that includes, for example, an instruction for execution by a processor. In order to be executed, the operational entry must be scheduled for execution in a functional unit. A functional unit may be any functional processing unit, for example, an arithmetic logic unit, an adder, a comparator, or a multiplier. However, the operation entry is not scheduled for the functional unit until it is in a ready state. The ready state includes having all necessary operand data available for use in the functional unit. In some instances, an operational entry is not in a ready state until it receives an update or result from a prior scheduled operational entry that was executed in the functional unit. Hence, the present invention includes a reservation system for tracking and scheduling those operational entries that are in a ready state.

Figure 1:
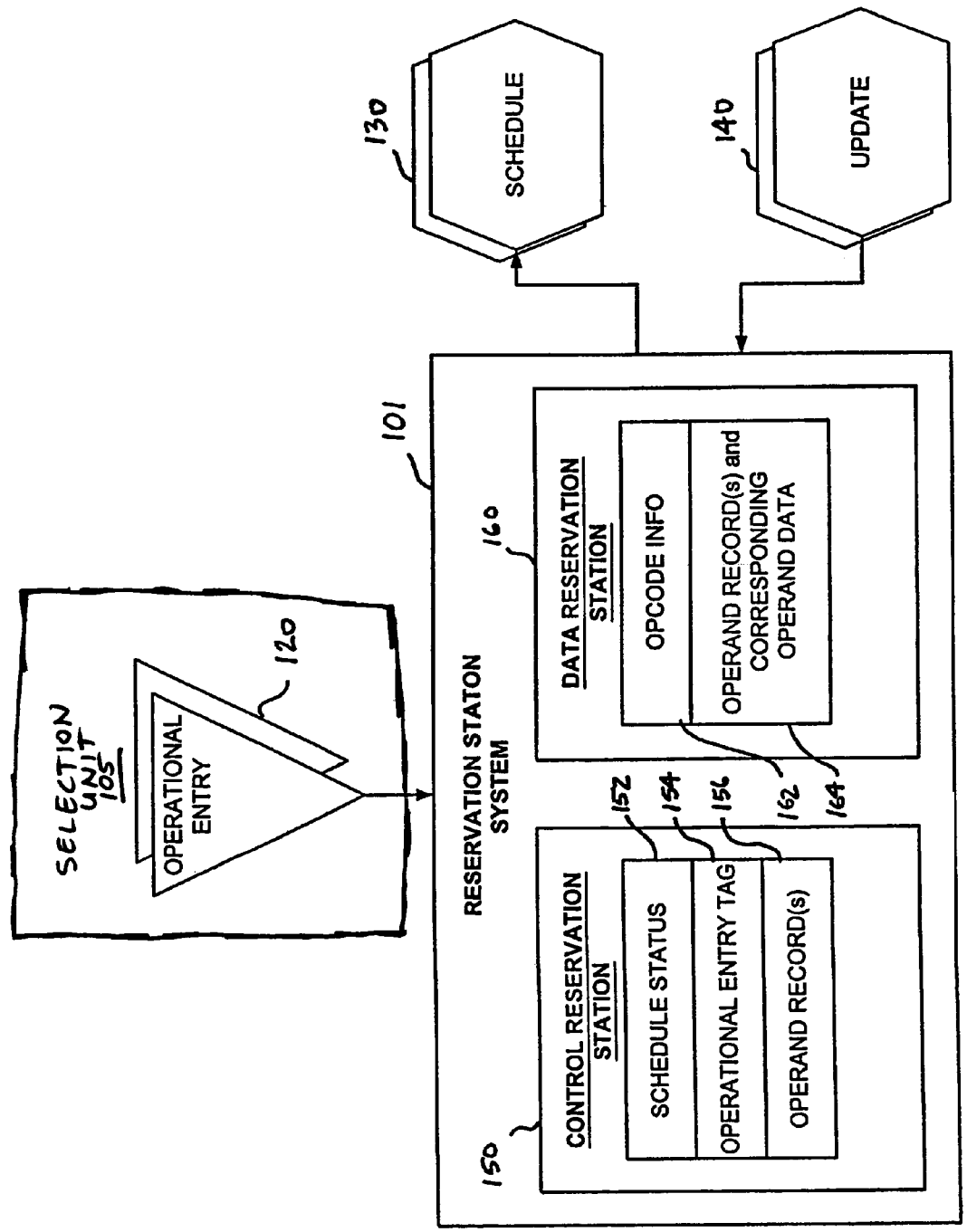
FIG. 1 illustrates a reservation station system for scheduling an operational entry in a processor in accordance with one embodiment of the present invention.

FIG. 1 illustrates a reservation station system 101 for scheduling an operational entry in a processor in accordance with one embodiment of the present invention. The reservation station system 101 receives one or more operational entries 120. The reservation station system 101 also schedules 130 instructions for issuance and receives updates 140 of resulting operand data from the execution of scheduled and issued instructions.

The reservation station system 101 may be configured to read and store the operational entries it receives within one or more registers or memory buffers. The reservation station system 101 includes a control (or central) reservation station ("CRS") 150 and a data reservation station ("DRS") 160. The control reservation station 150 is configured to read an operation entry 120 and store one or more control reservation station entries. Each control reservation station entry includes scheduling state information comprised of a schedule status 152 and an operational entry tag 154. Each control reservation station entry also includes one or more operand records 156 read from the operational entry 120. It is noted that the schedule status 152 may be referred to as a schedule status tag and the one or more operand records 156 may also be referred to as operand record tags.

The schedule status 152 provides a status for the operational entry 120 such that it indicates whether the entry is valid (or waiting for scheduling) or invalid (or already scheduled). The operational entry tag 154 provides a unique number that is used to identify the operational entry 120. Each operand record 156 includes operand state information and an operand tag. The operand state information provides information on whether the operational entry 120 is ready (or data is valid) or waiting (or data not yet available). The operand tag provides a tag of the instruction that will produce the required operand data. It is noted that the operational entry tag 154 may be used for the destination operand, while the operand record 156 may be used for the source operand.

The data reservation station 160 is configured to also read an operational entry 120 and store one or more data reservation station entries. Each data reservation station entry includes opcode information 162 and one or more operand records that include corresponding operand data 164. The opcode information 162 specifies the operation to be performed by the functional unit when the instruction is scheduled and then issued to that functional unit. The operand records that include corresponding operand data 164 includes the operand data itself and the operand record information described previously with reference to the control reservation station 150.

Figure 2:
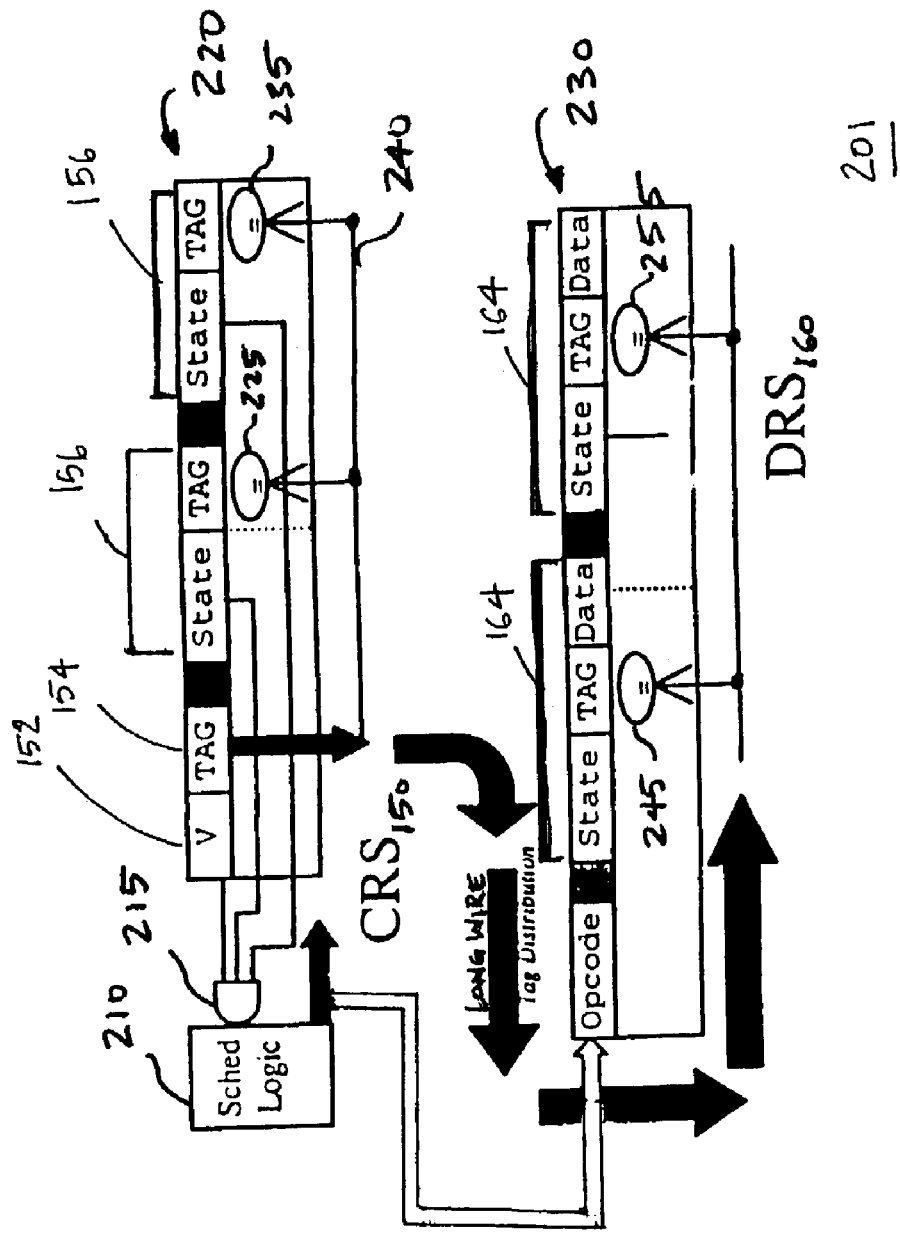
FIG. 2 illustrates a flow diagram of a data flow system and process for an operational entry in a processor in accordance with one embodiment of the present invention.

FIG. 2 illustrates a flow diagram of a data flow system 201 and process for the operational entry 120 in a processor in accordance with one embodiment of the present invention. This embodiment of the data flow system 201 includes scheduling logic 210, a logic unit 215 (e.g., an AND gate), one or more control reservation station entries 220 from the control reservation station 150, one or more data reservation station entries 230 from the data reservation station 160, comparators 225, 235, 245, and 255, and data bus 240. The data bus 240 may be, for example, a long wire or conductor, that may cross a processor chip layout from one end to another end. In one embodiment there is at least one data bus for each data reservation station 160 entry.

In FIG. 2, the control reservation station entry 220 includes the scheduling status ("V") 152, an operational entry tag 156, and two operand records 156. Each operand record 156 of the control reservation station entry 220 includes the operand state and operand tag. The data reservation station entry 230 includes the opcode information 162 and two operand records 164. Each operand record 164 of the data reservation station entry 230 includes the operand state, operand tag, and the operand data.

Generally, the control reservation station entry 220 checks to see if all of its entries are valid by determining whether the operand state of the operand records 156 are valid. If the operand states of the operand records 156 are valid, the control reservation station entry 220 is scheduled through the scheduling logic 210. The logic unit 215 may be an AND gate that confirms that the data passed on for scheduling is indeed ready by verifying that each input is a logic high (e.g., Logic "1"). In one embodiment, the data reservation station 160 is indexed by the output of the scheduling logic 210. The scheduling logic 210 is also used to index the control reservation station 150.

Once scheduled, the control reservation station entry 220 operand states of the operand records 156 are set to invalid and the output of the scheduling logic 210 is used as an index into a data reservation station entry 230 corresponding to the scheduled control reservation station entry 220. In addition, operand tags of the operand records 156 of the control reservation station 150 are distributed to all of the data reservation stations 160 by the data bus 240 as well as within the control reservation station 150. By distributing the operand tags of the operand records 156 within the control reservation station 150 itself, operand records that are dependent on these operand records have their operand states set to ready. Within the control reservation station 150, operand records 156 are updated by checking operand records 164 through the comparators 225, 235 to see which operand records 164 have operand states indicating "not ready" so that results that match those entries awaiting them from the distributed data can be captured.

When the data reservation station 160 having the data reservation station entry 230 corresponding to the control reservation station entry 220 receives the operational entry tag 154, it reads instructions using the output of the scheduling logic 210 as an indices. In addition, the comparators 245, 255 check to see which operand records 164 have operand states indicating "not ready" so that matching entries from distributed data from the control reservation station 150 are captured. The capture may occur within the same clock cycle or by the following clock cycle. In this manner, subsequent operation entries 120 are provided with complete operand records and would be ready for scheduling through the control reservation station 150.

Figure 3:
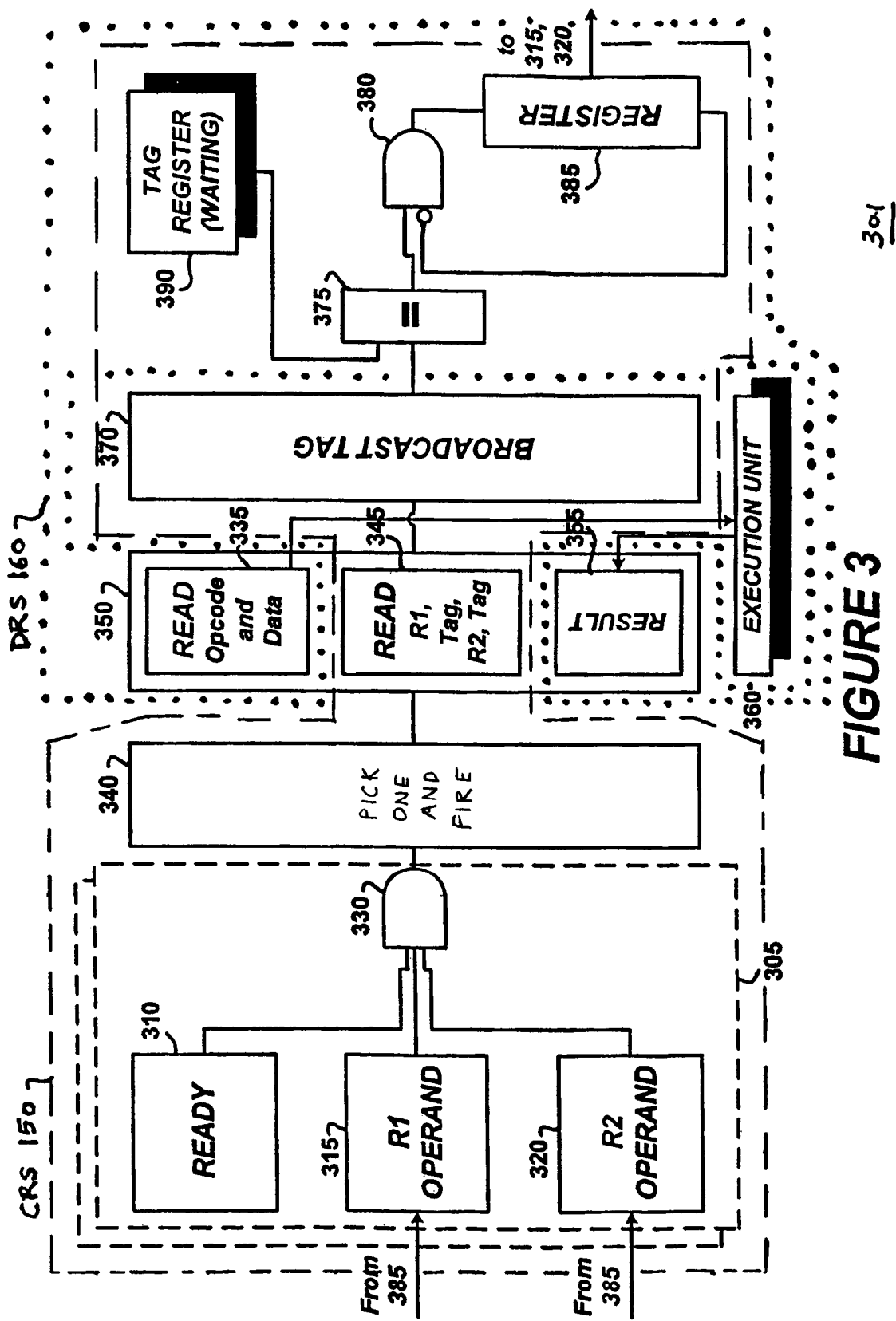
FIG. 3 illustrates a data flow scheduling system for a processor in accordance with one embodiment of the present invention.

FIG. 3 illustrates a data flow scheduling system 301 for a processor in accordance with one embodiment of the present invention. The data flow scheduling system 301 allows for traversing a data path in the data flow scheduling system 301 in one clock cycle by using a split data flow scheduling scheme and mechanism comprising the control reservation station 150 and the data reservation station 160.

In the data flow scheduling system 301, the control reservation station 150 includes one or more operational rows 305, a pick one and fire unit 340, a second read unit 345 (which may be a part of a read and result unit 350), a broadcast unit 370, a comparator 375, additional logic 380, a register 385, and a tag register (waiting) 390. For each operational row 305 there is a ready field 310, a first operand state (R1) 315, and a second operand state (R2) 320, and a corresponding logic AND gate or circuit 330.

The data reservation station 160 includes a first read unit 335 (which may be a part of the read and result unit 350), a result unit 355 (which may also be a part of the read and result unit 350), the comparator 375, the additional logic 380, the register 385, and the tag register (waiting) 390.

In the control reservation station 150, the pick one and fire unit 340 couples with the one or more operational rows 305 and the second read unit 345 of the read and result unit 350. The read and result unit 350 couples with an execution unit 360 and the broadcast unit 370. The broadcast unit 370 couples with the comparator 375. The comparator 375 couples with the additional logic 380 and the tag register (waiting) 390. The additional logic 380 couples with the register 385. Further, in the data reservation station 160, the first read unit 335 of the read and results unit 350 also couples with the execution unit 360.

The pick one and fire unit 340 is configured to pick an operational row 305 that is ready for scheduling as indicated by an output of the logic AND gate 330 being at a logic high (or logic "1"). The pick one and fire unit 340 may pick one operational row 305, but may also select more than one operation row 305 (or entry), which may allow for readying the entries at the same time. It is noted that the logic AND gate 330 will forward a ready for processing signal, i.e., the logic high, when a logic high is received from the ready field 310, the first operand 315, and the second operand 315.

Once an operational row 305 is selected as indicated through a logic gate 330 and the pick one and fire unit 340, the information in that operational row 305 is forwarded to the read and result unit 350. The read and result unit 350 is configured to read the appropriate parameters or fields relating to the operational entry 120 from the rows into the control reservation station 150 and the data reservation station 160. To do this, the read and result unit 350 includes a first read unit 335 that reads the opcode information and the operand data and a second read unit 345 that reads, for example, the first operand state (R1) 315 and its operand tag and the second operand state (R2) 320 and its operand tag.

Using this information, the control reservation station 150 and the data reservation station 160 function as previously described to schedule ready operational entries. The result unit 355 issues the instruction and the first read unit 335 issues the corresponding operand data for the ready operational entry to the execution unit 360 for execution.

The read and result unit 350 also forwards the operand tags to the broadcast unit 370. The broadcast unit 370 is configured to transmit, e.g. broadcast, the operand tags to the data reservation stations 160 as well as within the control reservation station 150. Specifically, operand records are updated by checking operand records within the control reservation station 150 and the data reservation station 160 through the respective comparators (collectively 375) to see which operand records have operand states indicating "not ready" so that matching entries from distributed data can be captured for these entries. In this manner, the operand state information in the operational rows 305 may be set to valid so that the control reservation station 150 can subsequently mark them for scheduling with the scheduling logic 210. The additional logic 380, the register 385 and the tag register (waiting) 390 are used to check if the first operand state (R1) and the second operand state (R2) operation of each entry is ready by comparing the operand tag (e.g., from the source) with the broadcast tag (e.g., from the destination).

Figure 6:
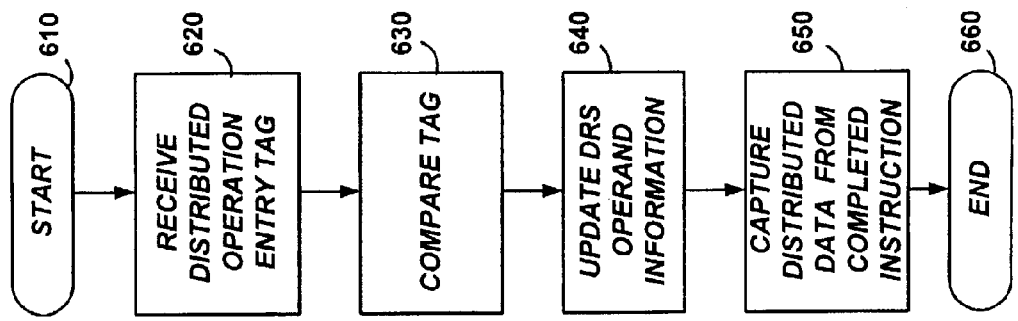
FIG. 6 illustrates a process for updating data reservation station entries in a data flow scheduling system for a processor in accordance with one embodiment of the present invention.
Figure 5:
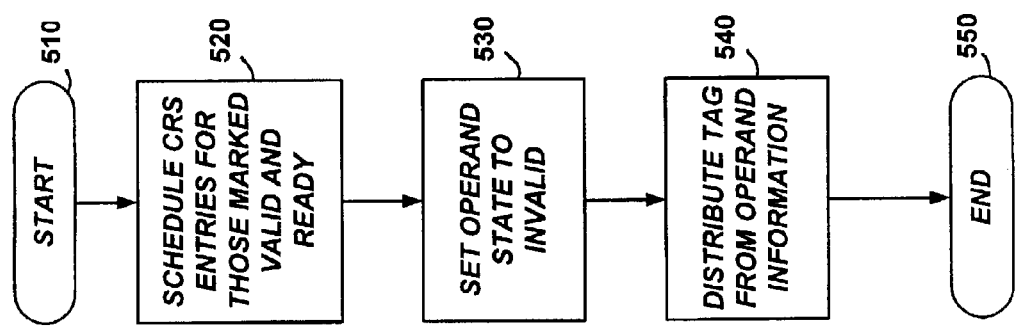
FIG. 5 illustrates a process for scheduling issuance of control reservation station entries in a data flow scheduling system for a processor in accordance with one embodiment of the present invention.
Figure 4:
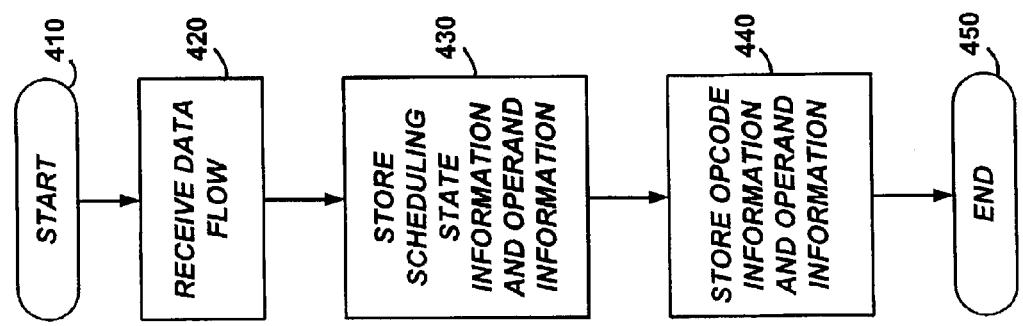
FIG. 4 illustrates a process for receiving and storing information for an operational entry in a data flow scheduling system for a processor in accordance with one embodiment of the present invention.

FIGS. 4 through 6 are flowcharts illustrating a process for scheduling operational entries 120 for issuance to a functional unit in accordance with one embodiment of the present invention. Turning first to FIG. 4, it illustrates one embodiment of a process for receiving and storing information for an operational entry in the data flow system 201 for a processor in accordance with the present invention. Initially, the process starts 410 and receives 420 a data flow. The data flow includes the one or more operational entries 120. The process reads and stores 430 scheduling state information and operand information into the control reservation station 150. The process also reads and stores 440 opcode information and operand information into a data reservation station of the one or more data reservation stations 160. These read and stored parameters may be reflected as an operational row in the one or more operational rows 305 as previously described in reference to FIG. 3. The process then ends 450.

FIG. 5 illustrates one embodiment of a process for scheduling for issuance control reservation station entries in the data flow system 201 for a processor in accordance with the present invention. The process starts 510 and schedules 520 one or more control reservation station ("CRS") entries from the control reservation station 150 that have the schedule status 152 of the scheduling state information marked as "valid" and the operand state information in the operand record 156 marked as "ready state." Once scheduled, the process sets 530 the scheduling state information for the control reservation station entry as an "invalid state." The process then distributes 540 the operational entry tag 154 corresponding to the scheduled control reservation station entry through the broadcast unit 370. The operational entry tag 154 is also distributed within the control reservation station 150. The process then ends 550.

FIG. 6 illustrates one embodiment of a process for updating data reservation station entries in the data flow system 201 for a processor in accordance with the present invention. The process starts 610 and the data reservation system 160 receives 620 the operational entry tag 154 from the control reservation station 150 and uses this operational entry tag 154 to compare 630 with the tag in the operand record 164. The instructions are issued to and executed by the functional unit 360.

The process then updates 640 the operand information in the control reservation station 150 and the data reservation station 160. The updated information includes the control reservation station 150 operand state 156 and the data reservation station 160 operand state. The updated information also includes the operand data 164. In particular, the process captures 650 the operand information from the completed instruction to distribute the resultant operand data for other data reservation station entries in the data reservation stations 160. The process then ends 660.

The present invention provides a benefit of dividing the functions of a reservation station between the control reservation station 150 and the data reservation station 160. The control reservation station 150 reduces or eliminates delays associated with distributed reservation stations across processor chips. The one or more data reservation stations 160 allows for data to be distributed and made available for functional units in a more efficient manner. Moreover, the control reservation station 150 and the one or more data reservation stations reduces complexity associated with the multiple data bus lines of distributed reservation stations. Hence, the present invention provides a scheduling scheme and mechanism that has the speed for completing operations within a single clock cycle while reducing complexity and need for large chip areas.

It is noted that the processor of the present invention is, for example, a conventional processing unit, for example, a central processing unit, a microcontroller processing unit, or a digital signal processor. Moreover, the processor may be a super-scalar processor, a reduced instruction set computer ("RISC") processor, or an instruction level parallel ("ILP") processor. The buffer memory or register for the reservation station system may be within the processor or may be a separate volatile or non-volatile memory. The processes and schemes for the reservation station system may be configured through software or firmware execution units. Alternatively, the reservation station system may be configured through a hardware execution unit, either above or in combination with processing software or firmware.

While particular embodiments and applications of the present invention have been illustrated and described, it is to be understood that the invention is not limited to the precise embodiments disclosed herein. Various modifications and variations will be apparent to those skilled in the art. These modifications and variations may be made in the arrangement, operation and details of the method and apparatus of the present invention disclosed herein without departing from the spirit and scope of the invention as defined in the appended claims.

What is claimed is:

1. In a processor system, a method for processing operational entries comprising:
    providing a control reservation station and a data reservation station;
    receiving at least one operational entry;
    identifying for each operational entry,
    scheduling state information, operand state information, opcodes, and operand data; and
    dividing a flow of the identified information such that the scheduling state information and the operand state information is stored in the control reservation station, and a plurality of the opcodes and a plurality of the operand data are stored in the data reservation station, and the plurality of the operand data not stored in the control reservation station.

2. The method of claim 1, wherein the operational entry is based on an instruction for execution.

3. The method of claim 1, further comprising:
    examining the scheduling state information and operand state information for the control reservation station; and
    marking as eligible for scheduling the control reservation station entry having operand state information indicating a ready state.

4. The method of claim 3, further comprising scheduling for execution by an execution unit at least one control reservation station entry marked as eligible.

5. The method of claim 3, further comprising:
    receiving a schedule tag provided from the scheduling state information; and
    reading a data reservation station entry corresponding to the schedule tag in response to the marking as eligible.

6. The method of claim 5, further comprising updating the operand state information in the control reservation station and the data reservation station in response to receiving the schedule tag.

7. The method of claim 5, further comprising:
    executing the operational entry;
    capturing distributed data resulting from completion of the execution of the operational entry; and updating data reservation station entries corresponding to the captured data.

8. The method of claim 1, further comprising:
identifying an operational entry tag for the operational entry, wherein the operational entry tag further comprises an index into a corresponding data reservation station entry in the data reservation station.

9. The method of claim 1, wherein the operand state information further comprises:
a state parameter for identifying operand data as either ready or waiting; and
if the state parameter identifies operand data as waiting, an operand tag for identifying an operational entry to produce operand data.

10. The method of claim 9, wherein the operational entry is scheduled in response to identifying the state parameter as ready.

11. A system for processing operational entries, the system comprising:
a first means for preparing an operational entry for processing;
a second means for preparing the operational entry for processing;
a means for receiving the operational entry;
a means for identifying from operational entry, scheduling state information, operand state information, opcodes, and operand data
a means for dividing a flow of the identified information such that the scheduling state information and the operand state information is stored in the first means for preparing, and a plurality of the opcodes and a plurality of the operand data are stored in the second means for preparing, the plurality of the operand data not stored in the first means for preparing.

12. The system of claim 11, wherein the operational entry is based on an instruction for execution.

13. The system of claim 11, further comprising:
a means for examining the scheduling state information and operand state information in the first means for preparing during a first clock cycle; and
a means for marking the first entry as eligible for scheduling in response to the first entry having operand state information in a ready state.

14. The system of claim 13, further comprising a means for scheduling execution of the first entry if marked as eligible.

15. The system of claim 13, further comprising:
a means for receiving a schedule tag provided from the scheduling state information; and
a means for reading an operational entry corresponding to the schedule tag in response to the marking as eligible.

16. The system of claim 15, further comprising a means for updating the operand state information in the first and second means in response to receiving the schedule tag.

17. The system of claim 15, further comprising:
a means for executing the operational entry; and
a means for capturing distributed data resulting from completion of the execution of the operational entry.

18. The system of claim 11, wherein the scheduling state information comprises:
a scheduling status of the operational entry; and
an operational entry tag.

19. The system of claim 18, wherein the scheduling status indicates the operational entry is either waiting for scheduling or was previously scheduled.

20. The system of claim 18, wherein the operational entry tag further comprises an index into a corresponding entry in the second means.

21. The system of claim 11, wherein the operand state information further comprises:
a state parameter for identifying whether data is either ready or waiting; and
an operand tag for identifying an operational entry to produce operand data.

22. The system of claim 21, wherein the operational entry is scheduled in response to identifying the state parameter as ready.

23. The system of claim 11, wherein the first means for preparing comprises a control reservation station.

24. The system of claim 11, wherein the second means for preparing comprises a data reservation station.

25. The system of claim 11, wherein the first means for storing comprises a memory.

26. The system of claim 11, wherein the first means for storing comprises a register.

27. The system of claim 11, wherein the second means for storing comprises a memory.

28. The system of claim 11, wherein the second means for storing comprises a register.

29. The system of claim 17, wherein the means for executing comprises an execution unit.

30. The system of claim 17, wherein the means for capturing distributed data comprises a register.

31. A reservation system for preparing an instruction for issue to a functional unit, the instruction awaiting at least one operand record, each operand record including operand state information and an operand tag, and the instruction associated with an opcode for specifying an operation to be performed by a functional unit, the reservation system comprising:
a central control reservation station configured to
read in a plurality of operand state information and a corresponding plurality of operand tags, each operand state information and each corresponding operand tag comprising a control reservation station entry,
identify and schedule each control reservation station entry marked as valid and having operand data in a ready state, and
distribute a schedule tag for each scheduled control reservation station entry; and
one or more data reservation stations, distributed from the central control reservation station, configured to
read in a plurality of opcodes and a plurality of operand data,
receive the schedule tag for each scheduled control reservation station entry, and
read an instruction corresponding to the schedule tag for each scheduled control reservation station entry
wherein the plurality of operand data is not read in by the central control reservation station.

32. The reservation system in claim 31, wherein the central control reservation station is configured to update the operand state information in response to receipt of the schedule tag.

33. The reservation system of claim 31, wherein the one or more data reservations stations are further configured to receive the operand data in response to execution of each read instruction.

34. The reservation system of claim 31, wherein the control reservation station is further configured to include a schedule status for each control reservation station entry.

35. The reservation system of claim 31, wherein the one or more data reservation stations are further configured to send each read instruction to a function unit.

36. The reservation system of claim 31, wherein the control reservation station comprises a memory buffer.

37. The reservation system of claim 31, wherein the control reservation station comprises a register.

38. The reservation system of claim 31, wherein the one or more data reservation stations comprise memory buffers.

* * * * *